US009963997B2

(12) United States Patent
Cornet et al.

(10) Patent No.: US 9,963,997 B2
(45) Date of Patent: May 8, 2018

(54) TANK AND METHOD FOR MANUFACTURING SAME

(71) Applicant: Techspace Aero S.A., Herstal (Milmort) (BE)

(72) Inventors: Albert Cornet, Verviers (BE); Stéphane Bougelet, Jambes (BE)

(73) Assignee: Safran Aero Boosters SA (BE)

( * ) Notice: Subject to any disclaimer, the term of this patent is extended or adjusted under 35 U.S.C. 154(b) by 523 days.

(21) Appl. No.: 14/285,071

(22) Filed: May 22, 2014

(65) Prior Publication Data

US 2014/0345247 A1 Nov. 27, 2014

(30) Foreign Application Priority Data

May 27, 2013 (EP) ..................... 13169374

(51) Int. Cl.
*F01D 25/18* (2006.01)
*B21D 51/10* (2006.01)
*B21D 51/18* (2006.01)
*F16N 19/00* (2006.01)

(52) U.S. Cl.
CPC ............ *F01D 25/18* (2013.01); *B21D 51/10* (2013.01); *B21D 51/18* (2013.01); *F16N 19/00* (2013.01)

(58) Field of Classification Search
CPC .......... F01D 25/18; F01D 25/20; F16N 19/00; B21D 51/10; B21D 51/18; B21D 51/24; B21D 51/2646
See application file for complete search history.

(56) References Cited

U.S. PATENT DOCUMENTS

| 1,858,638 | A | * | 5/1932 | Meredith | ................. F01M 5/00 |
|---|---|---|---|---|---|
| | | | | | 184/6 |
| 2,038,420 | A | | 4/1936 | Coakley | |
| 2,742,873 | A | * | 4/1956 | Moore | ..................... B21D 1/08 |
| | | | | | 72/427 |
| 5,259,481 | A | * | 11/1993 | Meuer | ..................... B60R 17/00 |
| | | | | | 184/45.1 |
| 5,323,953 | A | * | 6/1994 | Adderley | ............... B21D 51/24 |
| | | | | | 220/501 |
| 5,697,511 | A | | 12/1997 | Bampton | |
| 2011/0052932 | A1 | | 3/2011 | Pandey | |

FOREIGN PATENT DOCUMENTS

WO    WO 2005/015074 A1    2/2005

* cited by examiner

*Primary Examiner* — Arun Goyal
(74) *Attorney, Agent, or Firm* — Sandberg Phoenix & von Gontard P.C.

(57) ABSTRACT

The present invention relates to a method for manufacturing a tank (1) comprising a main body (4) with several compartments (7), a base (6) closing the lower part of the main body (4), and a cover (5) closing the upper part of the main body (4), said method comprising the following steps:

shaping sheets to produce the parts making up the tank (1);

assembling each of the component parts by butt welding in order to produce the tank (1).

7 Claims, 6 Drawing Sheets

TANK AND METHOD FOR MANUFACTURING SAME

CROSS-REFERENCE TO RELATED PATENT APPLICATIONS

This patent application claims priority to European Patent Application No. 13169374.9, filed May 27, 2013, the entire teachings and disclosure of which are incorporated herein by reference thereto.

Field of the Invention

The present invention relates to a method for manufacturing a tank. The present invention also relates to a fluid tank designed more particularly to be positioned in an environment of reduced size. Preferably, the tank is an oil tank designed to be positioned in a so-called "slim" airplane nacelle.

Background of the Invention

The oil tank is a component of the lubrication/cooling system of an airplane engine allowing to recover and store oil from the lubrication system.

In a bypass turbojet engine, the oil tank is positioned between the nacelle and the intermediate casing that delimits the primary flow path and the secondary flow path.

New so-called "slim" nacelles with a profile that is optimized in order to reduce drag have been created. In these nacelles, the space between nacelle and intermediate casing is reduced, with the result that the shape of the tank must be adapted. Currently, the tanks in so-called "slim" nacelles are flat, i.e., they are wider than they are deep. They are either made from aluminum and obtained by foundry, or from mechanically-welded steel. In both cases, the main faces, i.e., the flat faces of the tank, are maintained by a multitude of tie rods or baffles.

This geometry is not favorable to the mechanical strength of the tank and consequently requires the thicknesses of the tank and/or the number of tie rods/baffles to be increased in order to ensure the integrity of the parts. This results in drastically increasing the mass and cost of the tank in so-called "slim nacelle" environments.

Geometries close to a cylinder are the most favorable, after spheres, to withstand the pressure and vibrations that are specific to aeronautics. However, confined environments do not always allow the integration of a cylindrical tank in a single piece.

It is thus proposed in the state of the art to produce tanks for "slim nacelles" that comprise two cylindrical bodies. The proposed tanks have the drawback of being closed at their ends by domes manufactured by foundry, resulting in an increased mass and cost associated to the production of the parts by foundry.

AIMS OF THE INVENTION

The present invention aims to provide a tank specially adapted for reduced spaces and having very good mechanical strength given its design and method of assembly.

The present invention further aims to produce a tank with a reduced mass and obtained using an inexpensive method.

The present invention also aims to produce a tank that is easy to control with non-destructive tests.

BRIEF DESCRIPTION OF THE INVENTION

The present invention relates to a method for manufacturing a tank comprising a main body with several compartments, a base closing the lower part of the main body, and a cover closing the upper part of the main body, said method comprising the following steps:
    shaping sheets to produce the parts making up the tank;
    assembling each of the component parts by butt welding to produce the tank.

According to specific embodiments of the invention, the method comprises at least one or a suitable combination of the following features:
    the assembly is exclusively achieved by butt welding each of the component parts to produce the tank;
    the tank is formed by the assembly of two or more component parts;
    said component parts respectively comprise the cover, each of the compartments and the base;
    said component parts respectively comprise the cover and two half-shells each incorporating half of the base and half of the main body;
    said component parts respectively comprise two half-shells each incorporating half of the cover, half of the base and half of the main body;
    said component parts respectively comprise the base, the cover and a plurality of pieces of the main body;
    each compartment comprises, at each of its ends, at least one flange allowing an end-to-end assembly between the compartments.

The present invention also relates to a fluid tank for a turbojet engine, said tank comprising a main body with several compartments, a base closing the lower part of the main body, and a cover closing the upper part of the main body, characterized in that the main body, the base and the cover are essentially made from sheets.

According to specific embodiments of the invention, the tank comprises at least one or a suitable combination of the following features:
    said tank comprises butt welds and is free of fillet welds;
    each compartment comprises, at each of its ends, at least one flange that extends in a direction substantially perpendicular to the longitudinal axis of the compartment and connects the compartments to each other;
    each compartment comprises a portion with a cylindrical, nearly cylindrical or ovoid shape;
    the section of the compartment is not constant along the longitudinal axis of the compartment;
    said sheets are made from steel, stainless steel, copper, brass, aluminum or an aluminum or copper-based alloy;
    said tank is designed to be positioned between a nacelle and an intermediate casing of the turbojet engine.

Lastly, the present invention relates to a turbojet engine comprising a fluid tank as described above.

KEY (1) Tank
(2) Nacelle
(3) Casing
(4) Main body
(5) Dome, also called cover
(6) Base
(7) Compartment
(8) Protruding part, also called flange, over the end of the compartment

DETAILED DESCRIPTION OF THE INVENTION

Figure 1:
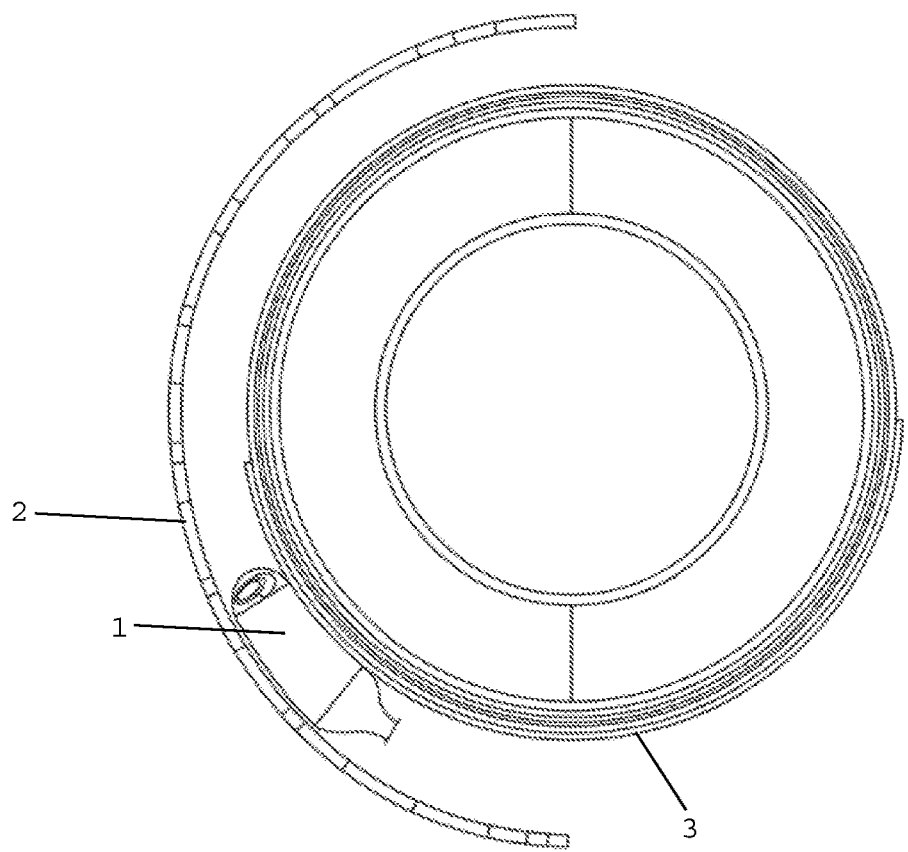
FIG. 1 shows diagrammatic views from different angles of the tank as in the invention positioned in a turbojet engine between the nacelle and the intermediate casing.
Figure 1:
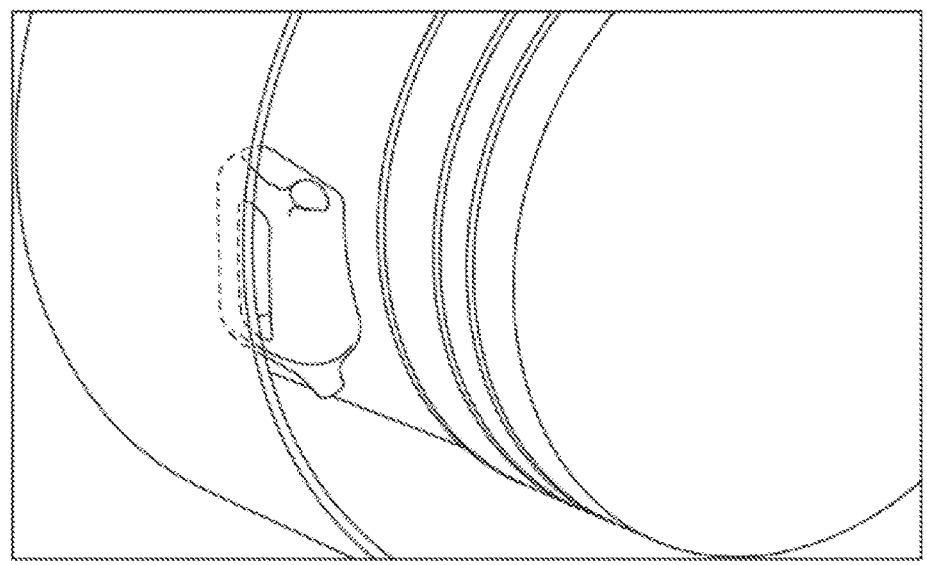

The present invention relates to a fluid tank more particularly designed to be arranged in an environment of reduced size, and to its manufacturing method. Preferably, the tank 1 as in the invention is an oil tank designed to be positioned in a turbojet engine between the so-called "slim" nacelle 2 and the intermediate casing 3 as diagrammed in FIG. 1.

Figure 2:
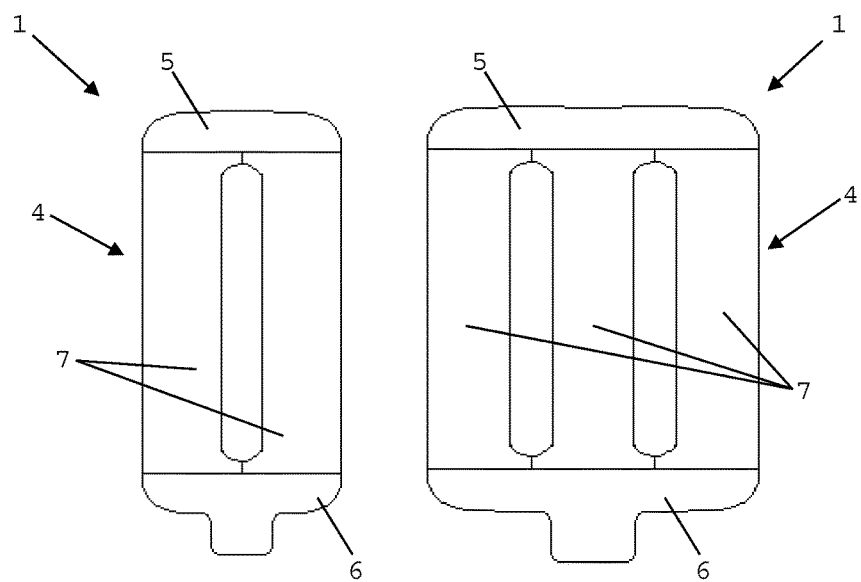
FIG. 2 shows two planar views of the tank as in the invention respectively comprising two or three substantially cylindrical compartments.
Figure 3:
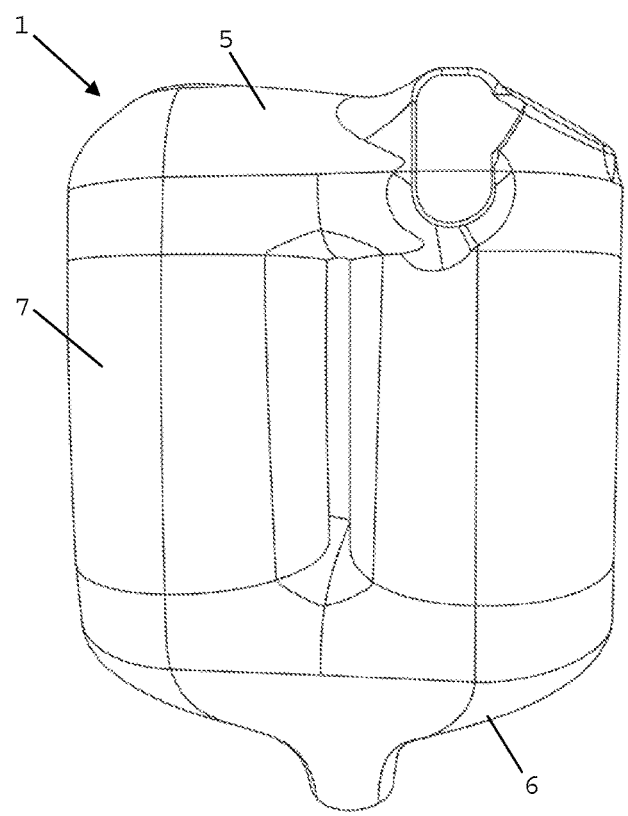
FIG. 3 shows a three-dimensional view of the tank as in the invention comprising two compartments.

The tank 1 illustrated in FIGS. 2 and 3 comprises a main body 4 closed at its respective ends by a base 6 and by a cover 5. The main body 4 comprises cylindrical or nearly cylindrical, or ovoid, compartments 7. According to the invention, the section of the compartment may vary along the longitudinal axis of the compartment. In this case, reference will be made to a "nearly cylindrical" shape rather than a "cylindrical shape".

Figure 4:
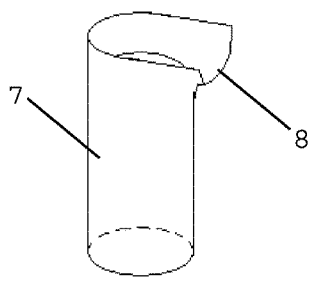
FIG. 4 shows a three-dimensional view of the upper part of a tank compartment as in the invention. The compartment is designed to be positioned at one of the side ends of the tank.
Figure 5:
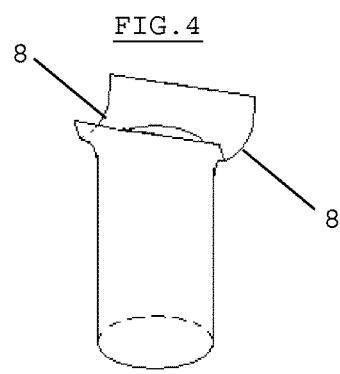
FIG. 5 shows a three-dimensional view of the upper part of the tank compartment as in the invention. The compartment is designed to be positioned in an intermediate position between the compartments of FIG. 4.

The main body 4 comprises at least two compartments 7. It may comprise two, three or more compartments (not shown), depending on the available space and required contents. The ends of the compartments comprise a flange 8, which can be seen in FIGS. 4 and 5 among others, that extends in a direction substantially perpendicular to the longitudinal axis of the compartment and connects the compartments after assembly. The flange may assume any shape allowing an end-to-end assembly between the compartments of the tank. In a configuration with two compartments, each end comprises a single flange as shown in FIG. 4. In a configuration with more than two compartments, the compartment(s) in the intermediate position comprise(s) two flanges at each end, as shown in FIG. 5.

According to the invention, the assembly of the tank is made from stamped sheets, or more generally shaped and/or cut sheets, without using single-piece foundry or machined parts. The component elements of the tank are shaped and/or cut so that they can be assembled together from the inside with butt welds, which facilitates welding and ensures that the latter can be tested. Preferably, the assembly is exclusively achieved by butt welding.

Still preferably, the tank is entirely made from sheets, for example steel or aluminum alloys. It will, however, be specified that the tank may be provided with means (valves, etc.) for supplying and/or recovering oil, and that the latter may be made from materials other than metal sheets. It is more accurate, in that case, to mention that the tank is essentially made up of sheets.

The tank may be assembled from a variable number of component elements. As one non-limiting example, the assembly method is described below for a tank comprising two compartments.

Figure 6:
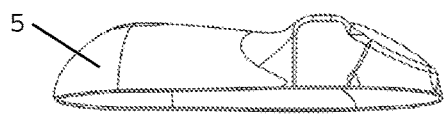
FIG. 6 shows a three-dimensional view of the different component elements of the tank made as in a first embodiment of the invention.
Figure 6:
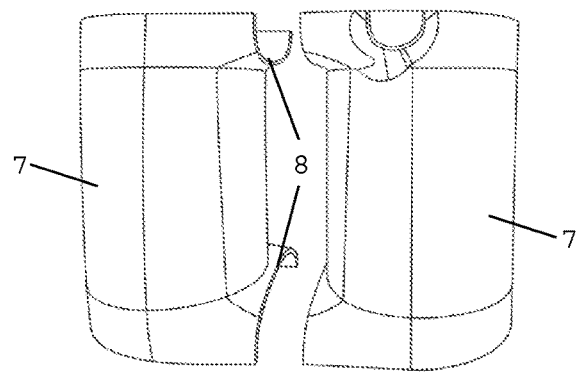
Figure 6:
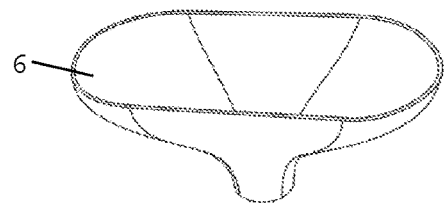

FIG. 6 shows one embodiment of the invention where the tank is assembled from four component elements, namely the cover 5, the base 6 and the two compartments 7. The end of the compartments has a particular geometry in the form of a flange 8 as already mentioned, which allows to assemble the two compartments end-to-end by welding.

Figure 7:
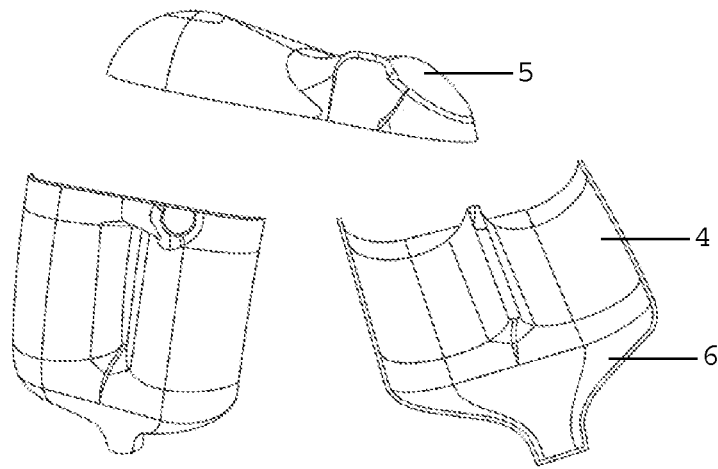
FIG. 7 shows a three-dimensional view of the different component elements of the tank made as in a second embodiment of the invention.

FIG. 7 shows another embodiment of the invention where the tank is assembled from three component elements. The assembly is made up of the cover 5 and two shells each comprising half of the base 6 and of the main body 4. Alternatively, the two shells may also incorporate the cover (namely one half thereof per shell), the assembly then being achieved from two component elements (not shown).

Figure 8:
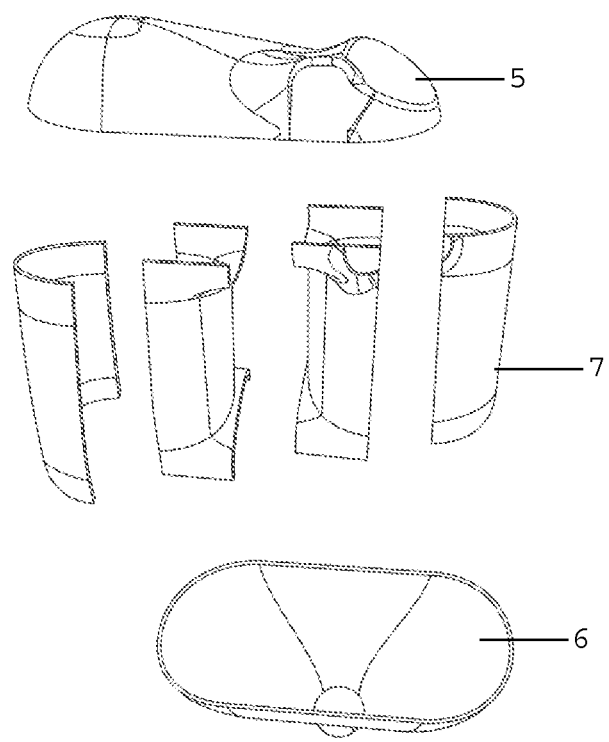
FIG. 8 shows a three-dimensional view of the different component elements of the tank made as in a third embodiment of the invention.
Figure 9:
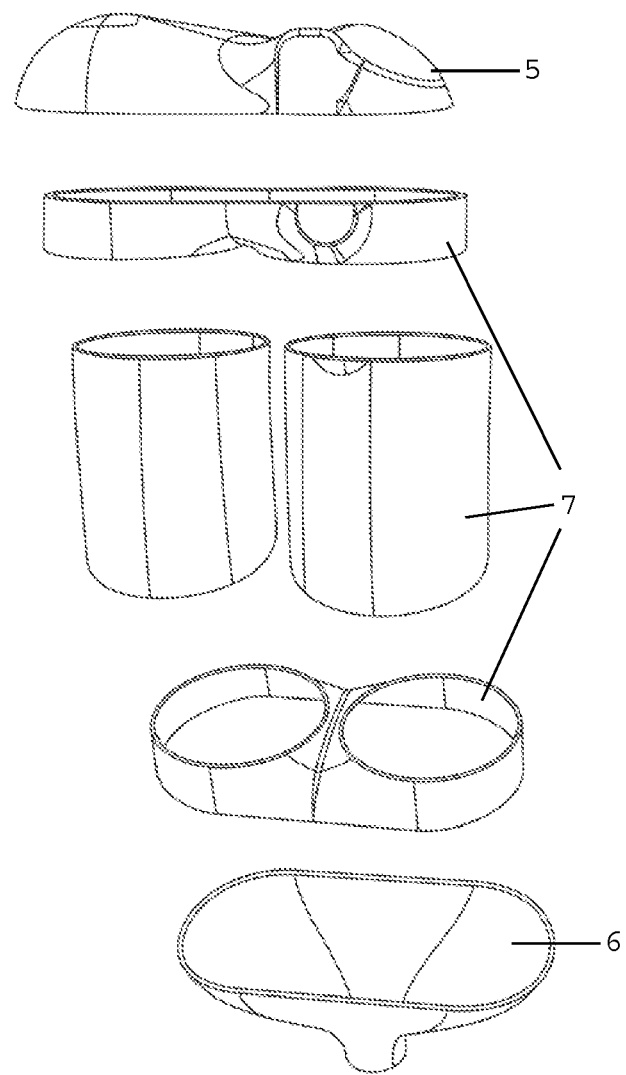
FIG. 9 shows a three-dimensional view of the different component elements of the tank made as in a fourth embodiment of the invention.
Figure 10:
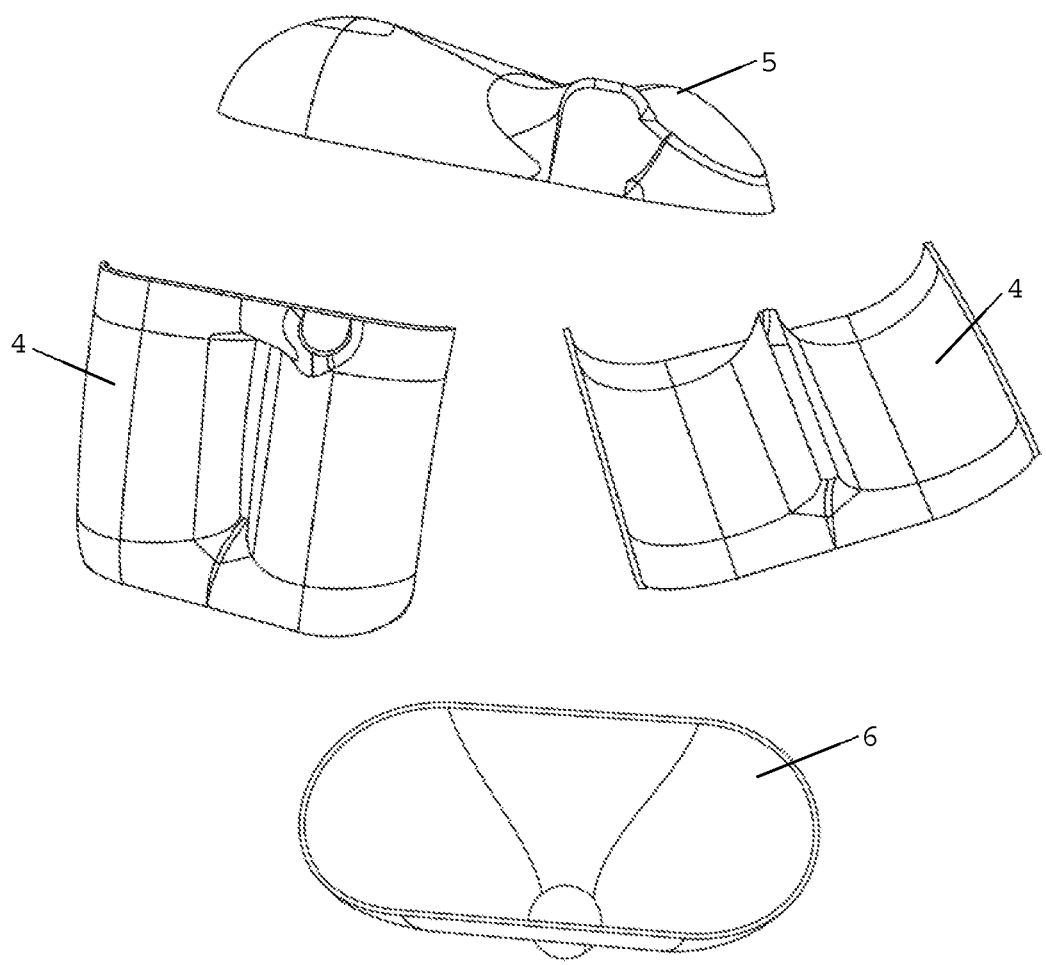
FIG. 10 shows a three-dimensional view of the different component elements of the tank made as in a fifth embodiment of the invention.

According to still another embodiment of the tank as in the invention, the assembly is achieved from six component elements. The assembly is made up of the cover 5, the base 6 and four pieces of compartments 7, as shown in FIGS. 8 and 9.

This is a non-exhaustive list of examples. It will generally be noted that the tank may be made from any number of component elements and that the object of the invention is to shape/cut the component elements made from the sheet such that they can be assembled by butt welding.

The present invention is illustrated for a turbojet-engine tank, but it extends to any application where a tank must be positioned in a confined space potentially subjected to vibrations.

ADVANTAGES OF THE INVENTION

The design of the component elements allows to produce a tank entirely from shaped/cut sheets. The elimination of cast parts thus allows to reduce manufacturing difficulties as well as the foundry-related mass.

The tanks as in the invention comprising substantially cylindrical or ovoid compartments offer better mechanical strength than the flat tanks as in the state of the art. Consequently, the thickness of the walls and therefore the total mass may be reduced, with an equivalent strength. In this respect, making the tank from steel sheets allows to achieve very low thicknesses without significantly increasing cost relative to parts obtained by foundry that have much higher manufacturing tolerances. It will also be noted that the tank as in the invention no longer requires the use of tie rods or baffles.

The assembly of the component elements of the tank with butt welds has many advantages relative to assemblies with fillet welds. First of all, butt welding is easier to achieve. Next, the butt welds are 100% controllable using non-destructive tests, which is not the case for fillet welds. The latter in fact have material discontinuities. Thus, during non-destructive testing, it is not possible to detect whether the detected defect comes from the weld or from the assembly. A better assembly and testing of the butt welds thus leads to a decrease in defects and discard rates. Lastly, butt welds are stronger than fillet welds and eliminate the risks of cracks spreading at the root of the weld.

Due to its shape and butt-welded assembly, the tank as in the invention is particularly suitable for confined spaces subjected to vibrations, such as airplane engines.

The use of steel, which intrinsically has good fire resistance, has the advantage that it is not necessary to provide additional fire protection.

The invention claimed is:

1. A fluid tank for a turbojet engine, said tank comprising:
 a main body provided with several compartments, each of the several compartments having one of a closed cylindrical or ovoid cross-sectional shape and extending along a longitudinal axis between a lower part and an upper part of the main body;
 a base having an open end and a partially closed end; and
 a cover having an open end and a partially closed end,
 wherein the main body, the base and the cover are essentially made from metal sheets and are welded,
 wherein each of the several compartments comprises a first end and a second end, wherein exclusively each of the first ends comprise a first flange that extends in a direction that is substantially perpendicular to the longitudinal axis of the compartment, and exclusively each of the second ends comprise a second flange that extend in a direction that is substantially perpendicular to the longitudinal axis of the compartment,
 wherein the first flanges of adjacent compartments of the several compartments connect together to establish fluid communication between the adjacent compartments, and the second flanges of the adjacent compartments connect together to establish fluid communication between the adjacent compartments, and
 wherein the open end of the cover attaches to the first flanges and the first ends of all of the several compartments, and the open end of the base attaches to the second flanges and the second ends of all of the several compartments.

2. The tank as in claim 1, said tank comprising butt welds and being free of any fillet welds.

3. The tank as in claim 1, wherein a cross-section of each of the several compartments is not constant along the longitudinal axis of the compartment.

4. The tank as in claim 1, wherein said metal sheets are made from steel, stainless steel, copper, brass, aluminum or an aluminum or copper-based alloy.

5. A turbojet engine comprising, said engine comprising a fluid tank, said tank comprising:
 a main body provided with several compartments, each of the several compartments having one of a closed cylindrical or ovoid cross-sectional shape and extending longitudinally between a lower part and an upper part of the main body;
 a base having an open end and a partially closed end; and
 a cover having an open end and a partially closed end,
 wherein the main body, the base and the cover are essentially made from metal sheets and are welded;
 wherein each of the several compartments comprises a first end and a second end, wherein exclusively each of the first ends comprise a first flange that extends in a direction that is substantially perpendicular to the longitudinal axis of the compartment and exclusively each of the second ends comprise a second flange that extends in a direction that is substantially perpendicular to the longitudinal axis of the compartment,
 wherein the first flanges of adjacent compartments of the several compartments connect together to establish fluid communication between the adjacent compartments, and the second flanges of the adjacent compartments connect together to establish fluid communication between the adjacent compartments, and
 wherein the open end of the cover attaches to the first flanges and the first ends of all of the several compartments, and the open end of the base attaches to the second flanges and the second ends of all of the several compartments.

6. The tank as in claim 5, wherein the first flanges and the second flanges, respectively of each of the several compartments, are connected together end-to-end by welding.

7. The tank as in claim 5, wherein each of the first flanges and of the second flanges have a U-shaped cross section.

* * * * *